H. ROUAIX.
Palette for Testing Oils.
No. 209,924. Patented Nov. 12, 1878.
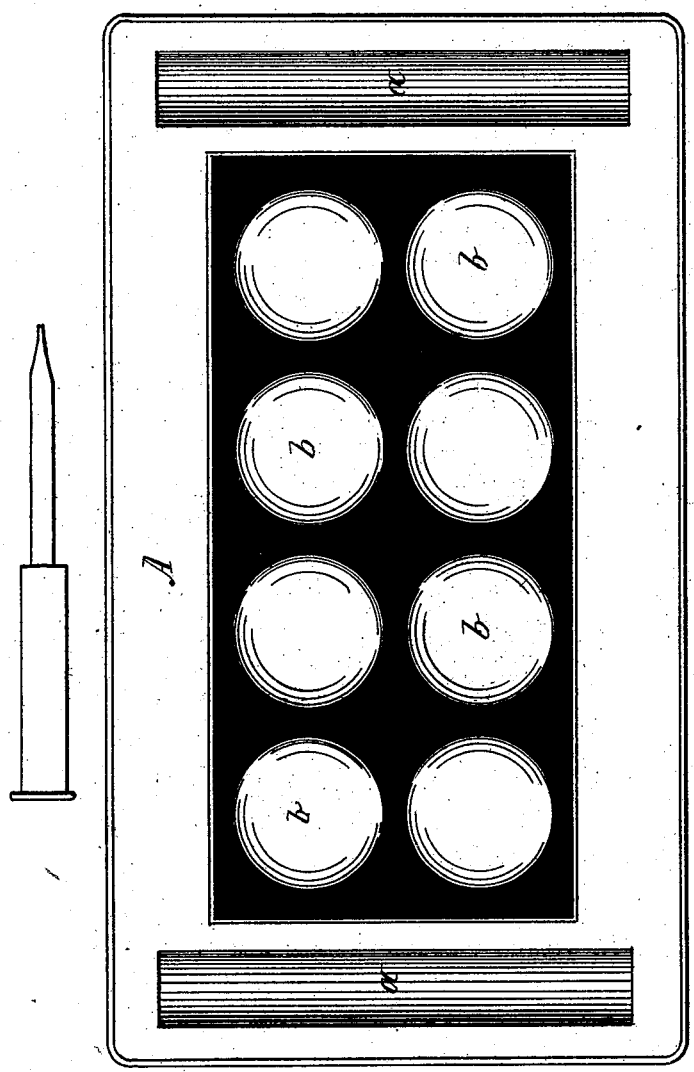

UNITED STATES PATENT OFFICE.

HENRI ROUAIX, OF PARIS, FRANCE.

IMPROVEMENT IN PALETTES FOR TESTING OILS.

Specification forming part of Letters Patent No. 209,924, dated November 12, 1878; application filed July 3, 1878.

*To all whom it may concern:*

Be it known that I, HENRI ROUAIX, of the city of Paris, in the Republic of France, have invented a new and useful Improvement in a Palette for Testing Oils, of which the following is a specification:

My invention relates to a new arrangement and construction of palette for instantaneously ascertaining the falsification of oils, such as the admixture of cheap oils with olive-oils and poppy-oils, or the admixture of fatty or oily substances with any oil whatsoever; and to that effect the invention consists in the construction and arrangement of a palette provided with a series of concave cavities or cups for the reception of the oil to be tested and the oils employed for comparison, said palette being made of white porcelain, while the ground or space between said cups is of a dark (preferably black) color, the palette being further provided with two longitudinal recesses or cavities for the reception of vials containing the acid or reagent by means of which the testing is effected, and a burette or dropping-tube.

Up to the present time no satisfactory means have been employed or produced for testing the purity of oils, except by chemical analysis, which process is not within the power of dealers generally, and is an expensive one, requiring time and labor and the knowledge of a chemist.

The object of my invention is to afford a means to every one for ascertaining almost instantaneously whether an oil has been falsified or not, without resorting to chemical analysis.

The method of testing oils by means of my improved palette consists, first, in establishing two standards of color—one as light as possible, which I find in pure olive-oil, the other as dark as possible, which I find in sesamum or sesame oil. Having established these two standards, I produce, by means of pure acid, a discoloration in the oil to be tested, and if falsified the degree of discoloration will at once reveal the percentage of foreign admixture with the oil in a given quantity of the latter.

The palette above referred to and shown in the accompanying drawing is made of white porcelain, and is provided on each end with a cavity to receive a dropping bottle or tube or burette, and containing an acid and the oil to be tested respectively. Between these two longitudinal cavities $a$ of the palette A are a series of round concave cavities, $b$, the body of the palette between these cavities or cups $b$ being of a dark color, preferably black, while the rest of the palette, as well as the cavities or cups, is white, which facilitates the observation of the discoloration of the oil.

I then proceed as follows: In one of the cups $b$, I pour a given number of drops of virgin oil, (pure olive-oil.) In the cup adjoining I pour a similar number of drops of the oil to be tested, and in the cup next adjoining the latter an equal number of drops of sesamum-oil, which is of a dark reddish brown, while the pure olive or virgin oil is of a very light yellow. I then add to the oil to be treated a sufficient quantity of pure acid to produce, if adulterated, the discoloration of the oil. I am then enabled to judge of the percentage of adulteration by the depth of color of the discolored oil to be tested.

I have found by experience that the concave cups of the palette give the best results, the degree of discoloration—that is to say, the depth of color—being more accurately discerned in concave cups than in cups of any other shape. Hence the comparison between the two standard colors is more easily made and the degree or percentage of adulteration more readily ascertained.

The discoloration produced by the action of the reagent being instantaneous almost, I am enabled to instantly ascertain the falsification or adulteration of any kind of oil. However, as it requires a certain experience to become acquainted with the various shades of discoloration which establish the degree of adulteration of the oils, I have made a standard-book of shades of colors for the various oils, by means of which the percentage of adulteration may be readily ascertained by comparison, each shade being provided with the percentage of adulteration.

Having now described my invention, what I claim, and desire to secure by Letters Patent, is—

A palette for testing oils, consisting of a white-porcelain plate, A, provided on each end with a longitudinal cavity or recess, $a$, for the reception of dropping-tubes or burettes, and with a series of concave cavities or cups, $b$, the ground of the palette between the cups $b$ being black, substantially as described, for the purpose specified.

In witness that I claim the foregoing I have hereunto set my hand at Paris this 1st day of April, 1878.

HENRI ROUAIX.

Witnesses:
P. GOWEN,
ROBT. M. HOOPER.